INVENTOR.
PETER D. KASPAR

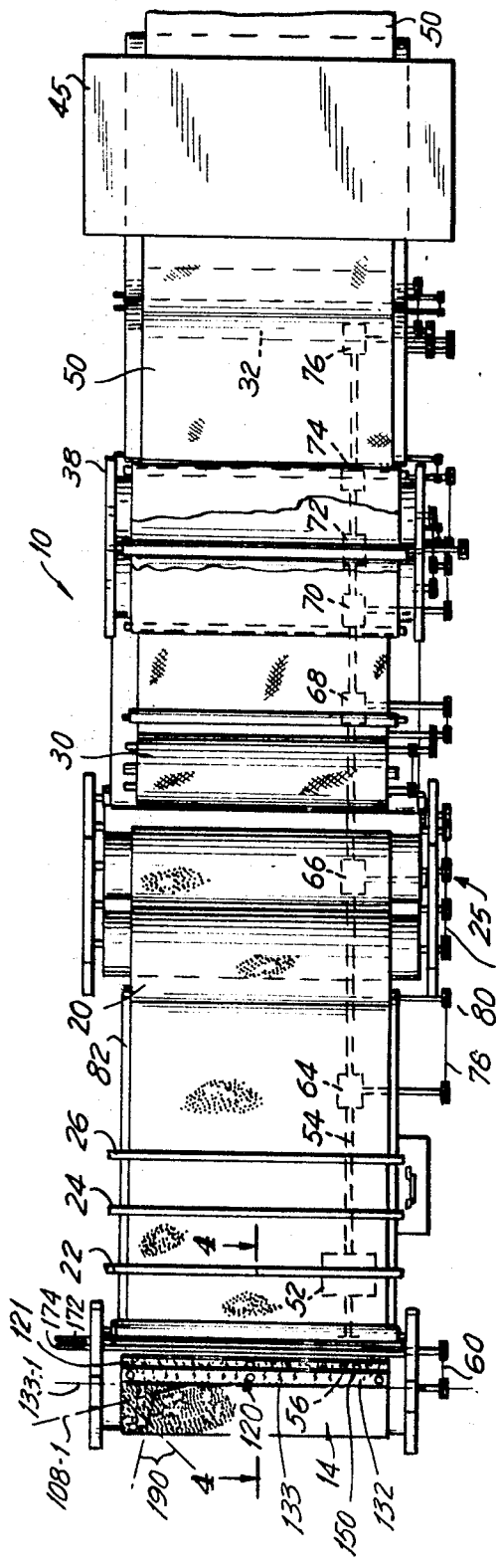

BY Stewart J. Freed

ATTORNEY

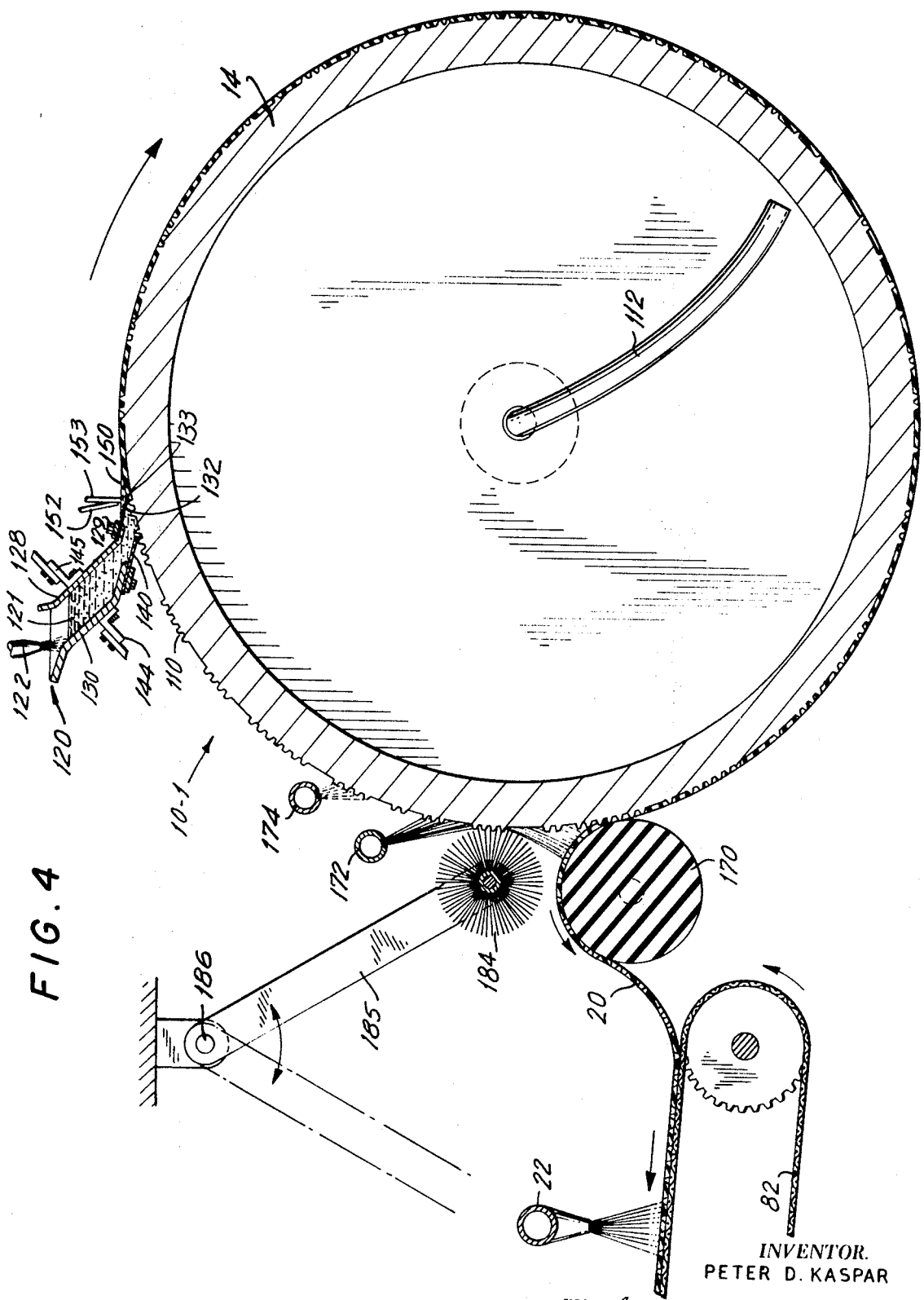

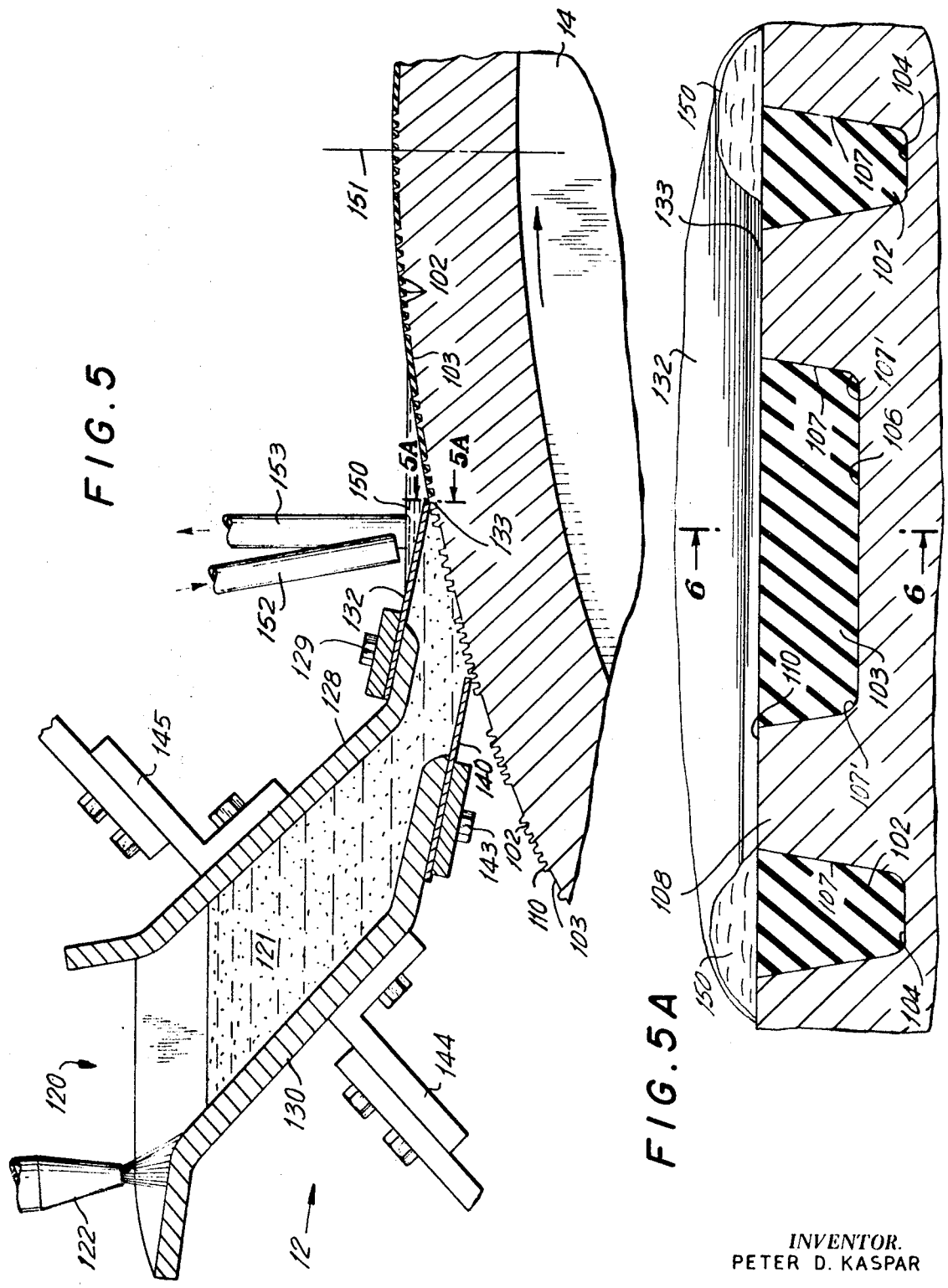

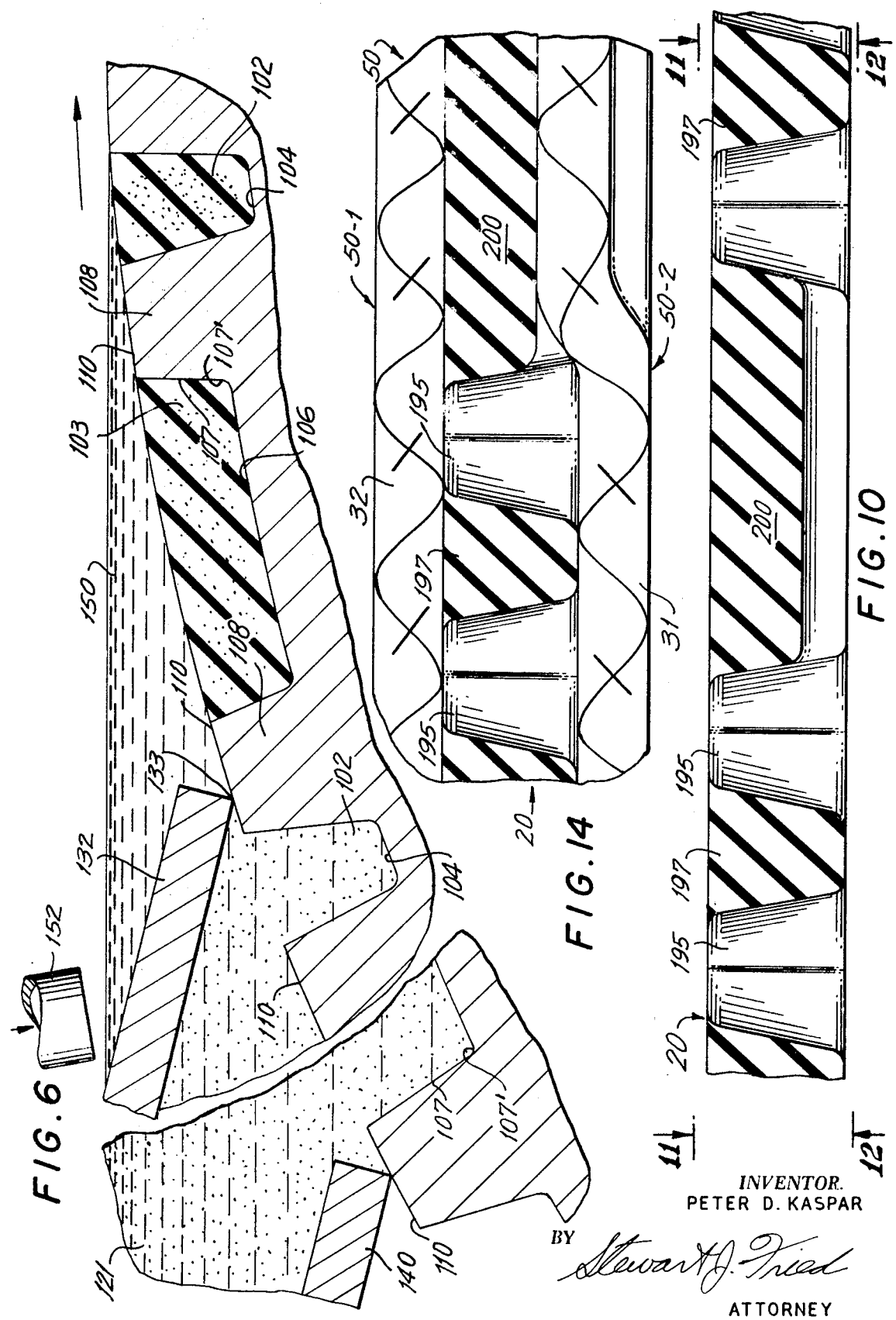

INVENTOR.
PETER D. KASPAR

ATTORNEY

INVENTOR.
PETER D. KASPAR
BY Stewart J. Fried
ATTORNEY

INVENTOR.
PETER D. KASPAR

Sept. 20, 1971             P. D. KASPAR           3,605,191
APPARATUS FOR THE CONTINUOUS FORMATION OF FARAMINOUS
ELASTOMERIC SHEET MATERIAL FROM A COAGULABLE LIQUID
Filed Feb. 4, 1969                                   12 Sheets-Sheet 9

INVENTOR.
PETER D. KASPAR

BY
ATTORNEY

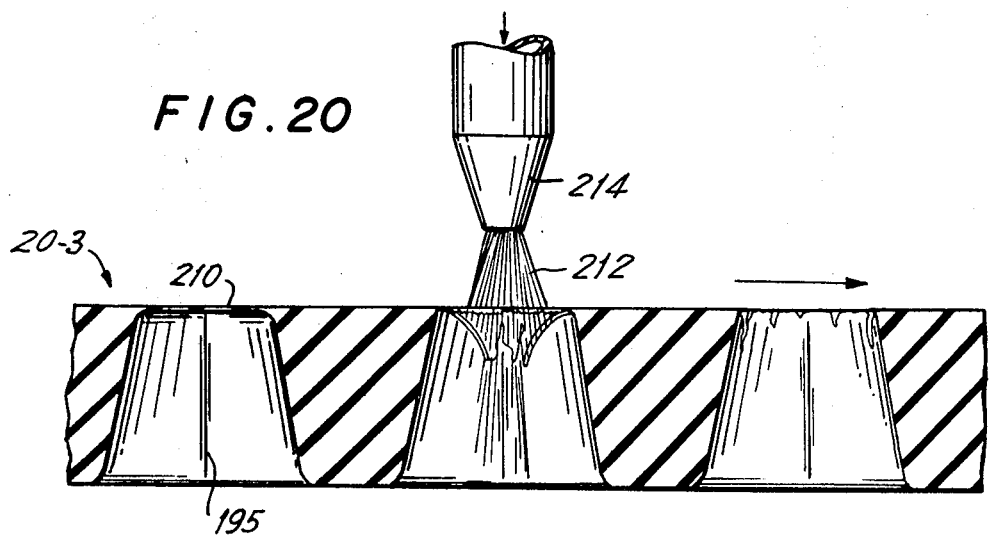
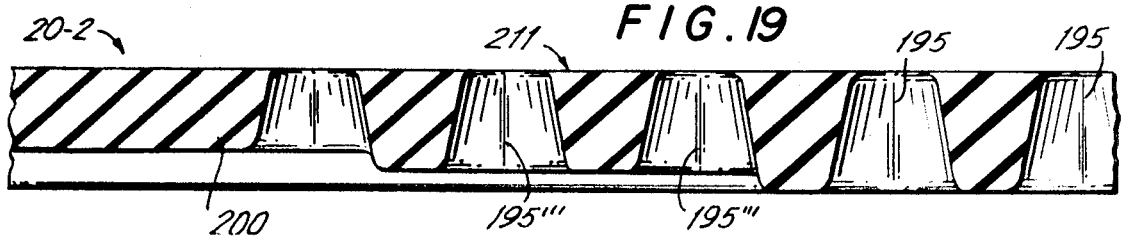

Sept. 20, 1971 P. D. KASPAR 3,605,191
APPARATUS FOR THE CONTINUOUS FORMATION OF FARAMINOUS
ELASTOMERIC SHEET MATERIAL FROM A COAGULABLE LIQUID
Filed Feb. 4, 1969 12 Sheets-Sheet 11

*INVENTOR.*
PETER KASPAR

BY *Stewart J. Fried*

ATTORNEY

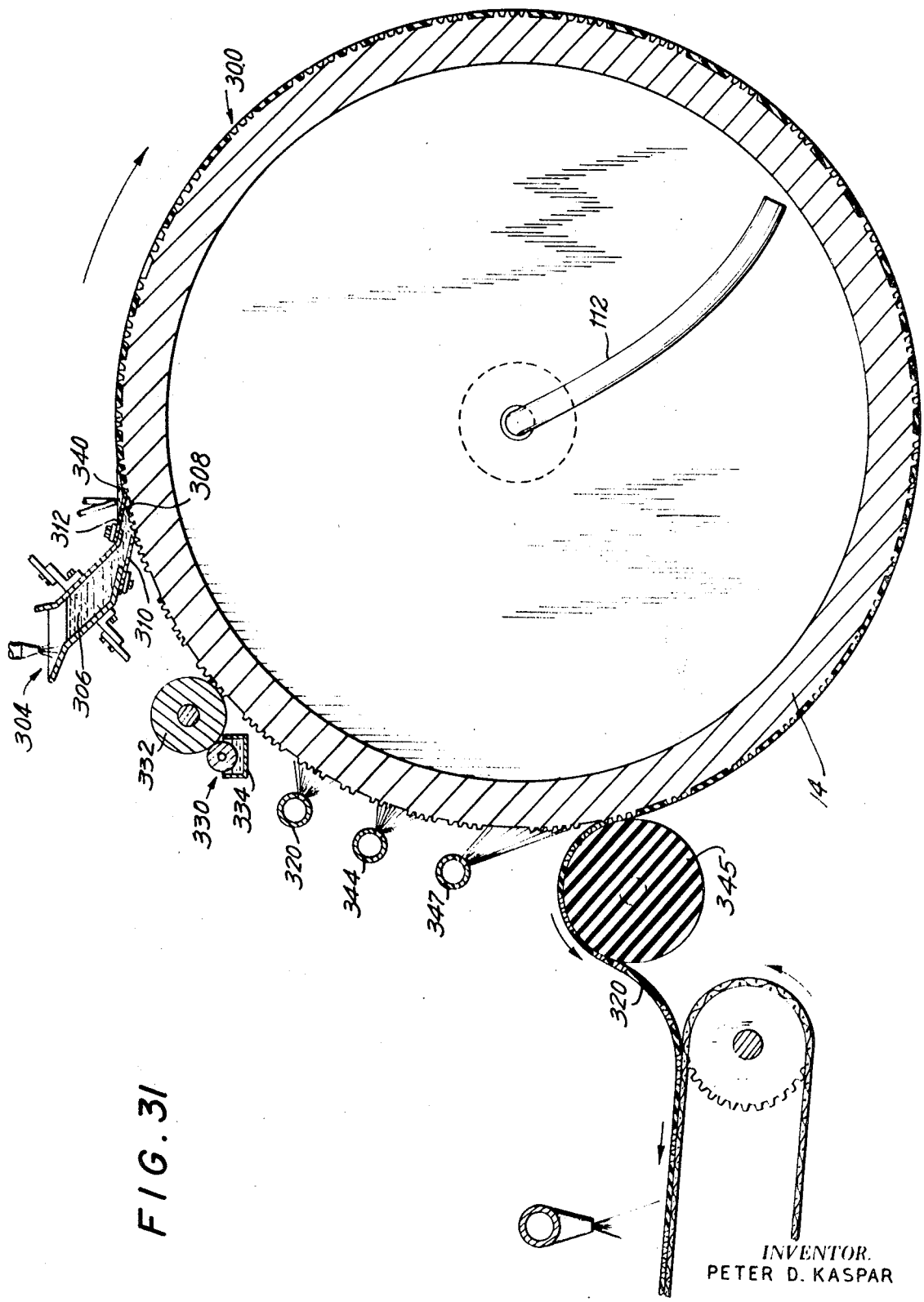

United States Patent Office 3,605,191
Patented Sept. 20, 1971

3,605,191
APPARATUS FOR THE CONTINUOUS FORMATION OF FORAMINOUS ELASTOMERIC SHEET MATERIAL FROM A COAGULABLE LIQUID
Peter D. Kaspar, Dover, Del., assignor to International Playtex Corporation, Dover, Del.
Continuation-in-part of application Ser. No. 704,783, Feb. 12, 1968. This application Feb. 4, 1969, Ser. No. 796,536
Int. Cl. B29c 13/04; B29d 7/00, 27/00
U.S. Cl. 18—15F
46 Claims

ABSTRACT OF THE DISCLOSURE

Apparatus and method are disclosed for the continuous formation of foraminous elastomeric sheet material from a coagulable liquid, such as a latex. The coagulable liquid is deposited on a forming means shown provided about the face of a rotatable cylinder, or alternatively along an endless conveyor belt. The liquid receiving surface of the forming means includes a space separated plurality of projections. The regions between these projections provide open faced locations for the reception of the coagulable liquid. A means for depositing the liquid as a layer on the forming surface is provided. This depositing means includes a spreading means at its exit which establishes the top surface of the liquid. An active gelling or coagulating agent is applied to the liquid layer immediately emerging from under the spreading means to prevent the formation of a gelled or coagulated film over the projection top surfaces, and form a hole in the deposited layer at each projection location. In the disclosed embodiments the spreading means is provided by a flexible blade member which wipes along the tops of the projections. The surface coagulant also serves to prevent the build-up of a coagulum along the blade spreading region. The liquid is coagulated and stripped from the forming surface as sheet material. In order to reduce the coagulation time, a heat-sensitive coagulable liquid may be used, with appropriate heat being applied to the forming surface.

The sheet material formed on the above-described apparatus has a high degree of uniformity and may have a substantial number of holes per unit area. The number and placing of the holes is determined by the configuration of the forming surface. Areas of contrasting numbers and sizes of holes per unit areas are utilized to form a lace-like material or to provide other desired characteristics in the sheet. The hole sizes and distribution of material may be suitably modified in order to prevent the creation of undue stresses in certain regions of the stretched material.

RELATED U.S. APPLICATION

This application is a continuation-in-part of my copending application, Ser. No. 704,783, filed Feb. 12, 1968, and entitled "Method and Apparatus for Making Foraminous Sheet Material and Composite Material and Articles Made Therefrom," and subsequently abandoned in favor of the instant application.

This invention relates to an improved apparatus for the continuous formation of sheet material from a coagulable liquid. The invention particularly lends itself to the formation of such sheet material which is foramious, and may be laminated to stretch-fabric outer layers. For a detailed discussion of the typical characteristics and applications of such laminated material, reference is made to copending U.S. Pat. application Ser. No. 706,066, filed Feb. 16, 1968 in the name of myself and Paul Ambrose, and entitled "Composite Sheet Material and Articles Made Therefrom," subsequently abandoned in favor of Ser. No. 820,-044 filed Apr. 8, 1969 and now issued as U.S. Pat. No. 3,489,154.

A principal present use of my invention is directed to foraminous sheet material formed of a latex, which after coagulation and processing provides an elastomeric sheet. Other coagulable liquids may also be emloyed, and where desired, the resultant sheet material may have lesser or greater elastomeric qualities than the products resulting from the particular details of the herein disclosed embodiments. Thus, while the ensuing discussion will principally be directed towards the operation of my apparatus and methods of manufacture for fabricating foraminous latex sheet material, this is done primarily to avoid any undue prolixity. The term "latex" is not limited to rubber latex, but is inclusive of vinyl latex as well as other suitable colloidal dispersions. With this in mind it should be understood that the foregoing use of the term "latex" is primarily for convenience of reference, and is not limited to the particular compounds disclosed herein.

It has heretofore been known how to fabricate continuous foraminous latex sheet material by the successive spray deposition of liquid latex on an open mesh-type forming conveyor. Typically, where it is desired that the foraminous sheet material be lace-like in appearance, the forming conveyor consists of a continuous belt of suitably treated configurated material. A practical fabrication technique in accordance with this arrangement is shown in my co-pending U.S. Pat. application Ser. No. 705,210, filed Feb. 13, 1968 and entitled "Method of an Apparatus for Forming Foraminous Material and Composite Material." For practical reasons, spraying requires that the film be built up gradually. It should thus be appreciated that this tends to limit the production output. It has also been determined that although the fabrication technique of my aforementioned patent application Ser. No. 705,210 does have a high degree of practicality, the production costs are also increased by the considerable unrecoverable loss of sprayed material.

Additional manufacturing costs are incurred by the need to periodically replace the configurated belt, which constitutes the spray receiving surface, since this belt is subjected to gradual deterioration as the latex sheet material is repeatedly stripped off its surface. It has also been observed that such stripping of the sheet material off the belt may cause minute surface fissures on the foraminous sheet material. Such fissures could in time create somewhat weakened areas within this foraminous sheet material, and after prolonged use they could initiate ruptures in the material. While such possible weakened areas do not negate the practical usefulness of the product, I have determined that the elimination of these minute surface fissures could further enhance the resultant product.

Other techniques previously utilized for obtaining foraminous sheet material have included perforating a solid sheet, such as calendered stock. However, such perforations are substantially limited as to number per unit area, and the puncturing of the sheet has a tendency to cause ragged edges, giving rise to tearing and accelerated deterioration in use.

The present invention avoids the above problems of the prior art, and provides an improved product, advantageously fabricated in a much simpler and less costly manner than heretofore available. As disclosed in my parent application Ser. No. 704,783, I have found that foraminous latex sheet material may be formed by depositing a layer of latex on a relatively movable forming surface, such as the face of a rotating cylinder. The forming surface has a solid base means (as contrasted to the belt discussed in conjunction with U.S. application Ser. No. 705,210) with a spaced plurality of projections extending therefrom. The liquid latex is applied to the relatively movable forming surface by unique depositing means having a spreading means at its terminus.

The spreading means, shown as a flexible blade, controls the depositing of the latex, thereby governing the depth of liquid latex deposited on the forming surface. The liquid latex is then suitably gelled and stripped off the forming surface as sheet material. In accordance with a particularly advantageous aspect of my invention wherein the forming surface projections provide the locations for hole openings in the foraminous sheet material, as the deposited latex layer emerges from under the spreading blade, an active surface coagulant is immediately applied to the latex. The surface coagulant may be a liquid which serves to prevent the formation of coagulated film over the tops of the projections. Thus, smooth well defined openings are provided at each of the projection locations.

I have also determined that the presence of the coagulant at the edge region of the spreading blade serves continuously to keep the blade itself clean of latex coagulum. Thus, although the present inventive concept would embrace the utilization of separate means for inhibiting the formation of a coagulated film over the projection tops, and the cleaning of the blade, I have found that the application of such a surface coagulant at the edge region of the blade serves to accomplish both of these critical functions in an extremely efficient, convenient and economical manner.

In my aforementioned patent application Ser. No. 704,783, there is generally discussed a prior art patent to Ratignier et al. (U.S. Pat. 934,214) which illustrates some general similarities to certain aspects of my principally disclosed embodiment. Ratignier et al. is concerned with a continuous method of producing an artificial lace fabric from a plastic collodion. The liquid collodion is located within a funnel positioned above the engraved forming circumference of a rotating cylinder. Some distance away from the depositing funnel, the excess collodion is smoothed off the surface by one or more strickles. Further displaced from the smoothing strickle, a hardening agent such as a coagulant, is applied to solidify the collodion. The substantial displacement between the strickle, hardening agent, and depositing funnel renders the Ratignier et al. method and apparatus impractical for forming the unique type of material advantageously obtained in accordance with my invention.

My forming surface may, for example, have a lace-like pattern configuration formed therein. Such a lace-like configuration has been found to have considerable consumer appeal when utilized for body undergarments such as girdles. It should, however, be understood that the use of a lace-like configuration on the forming surface is only exemplary.

When a lace-like configuration is used there will be relatively closed regions of the elastomeric sheet which include a greater surface of latex per unit area than at other regions which are relatively open or mesh-like (e.g. the petals of the lace canfiguration may be at such relatively closed regions). When such a sheet is subjected to an elongation stress, the relatively open regions offer less resistance to stretch; and therefore, will tend to stretch more than the relatively closed regions. This distorts the configuration, and by influencing the stretch at the relatively open regions weakens the sheet. In order to minimize this difference of stretch, I may provide for a lesser thickness of elastomer at such relativtly closed regions. Such lesser thickness of elastomer may be conveniently provided in accordance with my present invention by having a reduced latex receiving depth on the forming surface. Also, since those portions of the mesh-like open regions which border the relatively closed regions may be subjected to considerable stretch stresses, I may also provide smaller cross-sectional holes at such bordering regions. Accordingly, I can achieve a more uniform stretch over the entire area of the foraminous sheet material than in the products of the prior art.

Where the deposited liquid is a latex, I preferably use a latex compound having a predetermined degree of heat-sensitivitly. Accordingly, the gelling of the liquid latex into a sheet may be accelerated by applying heat to the forming surface. This provides the practical advantage of permitting an increase in the production rate to lower the cost of the fabricated material.

In the principally disclosed embodiments of the apparatus incorporating my invention, the means for depositing the liquid latex on the forming surface comprises a trough which forms a reservoir for the latex. The trough has an exit constituting a feeding mouth for controlling the deposition of the latex onto the forming surface; the feeding mouth comprising a moving portion of the forming surface adjacent thereto. The forming surface is shown provided about a cylinder, or along an endless conveyor. In either arrangement (or other arrangements within the scope of my invention), the trough feeding mouth is located in juxtaposition to a relatively small portion of the forming surface.

Relative movement is provided between the trough and the forming surface, (by rotating the cylinder or moving the conveyor belt, or by moving the trough), so that successively adjacent portions of the forming surface face the reservoir. The latex liquid in the reservoir is sequentially deposited onto successively adjacent portions of the forming surface. The terminus of the reservoir opening includes the spreading means, which overlies the liquid latex just emerging from under the feeding mouth.

A flexible spreading blade is positioned in contact with the top surfaces of the forming surface projections. The spreading blade is so positioned with respect to the forming surface that a valley is formed. One side of the valley is the blade, and the other the forming surface. An active liquid coagulant forms a pool within this valley. The action of the coagulant serves to coagulate the latex as it emerges from under the blade and prevent its filming over the projection tops. The projection tops have no latex on them, by virtue of their metal-to-metal (for example) contact with the blade. This creates a hole at each of the projection locations. It has also been determined that the application of an active coagulant at the blade edge region serves to keep the blade clean, and prevent the build-up of a latex coagulum. I have determined that by a proper combination of the latex and coagulant characteristics, in conjunction with the machine parameters, I can produce foraminous sheet material, without leaving any latex residue on the projection tops. This dispenses with the need to clean the forming surface between the stripping of the sheet material and the subsequent application of another latex deposit.

The product manufactured in accordance with my apparatus and method of manufacture is a substantially faithful reproduction of the forming surface. Since the forming surface may be constructed to facilitate the smooth stripping of the sheet material, the resultant sheet material demonstrates a high degree of uniformity and surface smoothness, thereby providing an end product of enhanced practical utility.

Foraminous sheet material of the present invention demonstrates particular utility when used in conjunction with body constricting garments, such as girdles. Such products are discussed in aforementioned U.S. Pat. No. 3,489,154, which discloses a laminated material formed by bonding thin stretch fabric outer layers to the opposite faces of an inner foraminous layer. By utilizing the foraminous sheet material of the present invention as the inner layer, an improved product is obtained capable of demonstrating a more uniform stretch characteristic over its surface, and offering greater resistance to flex-cracking or other degradation.

Such a laminated material also has application in conjunction with other garments wherein substantial porosity is required for the wearer's comfort (e.g. bathing suits and brassieres).

It is therefore seen that a primary object of the present invention is to provide a novel apparatus for forming improved sheet material from a gelatinous liquid.

Another object of the present invention is to provide an improved apparatus for the production of foraminous sheet material having elastomeric qualities.

A further object of the present invention is to provide such an apparatus for the manufacture of foraminous sheet material, which includes a means for depositing a liquid on a forming surface, while spreading and surface gelling the liquid to define hole openings at required locations, and also gelling the liquid layer into a sheet of material.

An additional object of the present invention is to provide such an improved apparatus wherein the depositing means consist of a reservoir of latex within a trough, the trough having a bottom exit forming the mouth and a spreading blade constituting the terminus of the reservoir, with an active surface coagulant being applied to the spreading edge of the blade as the latex liquid emerges.

Still another object of the present invention is to provide such an apparatus in which the surface coagulant is provided by a liquid pool, with the liquid therein contacting the edge of the spreading blade and the liquid latex emerging thereunder.

Still a further object of the present invention is to provide an improved apparatus for forming self-sustaining latex sheet material, which includes a rotating cylinder having a plurality of projections on its face, and a depositing means for continually placing a desired depth of latex material on the cylinder's face in a manner defining openings at each of the projection locations.

Yet another object of the present invention is to provide an apparatus to produce a deposited sheet of foraminous material having a desired uniformity.

Yet a further object of the present invention is to provide an apparatus to produce a foraminous sheet of elastomeric latex which may have in certain preselected regions of the sheet material a lesser thickness than in other regions of the sheet material.

Yet an additional object of the present invention is to provide an apparatus to produce such a foraminous sheet of elastomeric latex which includes substantially open mesh regions and substantially closed regions having a greater surface of latex per unit area, in which the relatively closed regions may be of such a predetermined lesser thickness in order to provide a more uniform stretch.

These as well as other objects of the present invention will become apparent upon a consideration of the following description and drawing in which:

FIG. 1 is a plan view of an apparatus built in accordance with my invention, incorporating certain preferred embodiments thereof, and having application for the practice of the method of my invention, and the production of the novel product.

FIG. 2 is a side view of the apparatus shown in FIG. 1.

FIG. 4 is a cross-sectional view of the portion of the apparatus for forming the sheet material.

FIG. 5 is an enlarged cross-sectional view of the depositing means shown in FIG. 4, and includes further details thereof.

FIG. 5A is a cross-sectional view along the lines 5A—5A of FIG. 5, and shows the manner in which the flexible spreading blade contacts the forming surface and the coagulable liquid immediately emerging from under the spreading blade, and the application of the surface coagulant at the blade edge region.

FIG. 6 is a further enlargement of a portion of the depositing means along the lines 6—6 of FIG. 5A and particularly directed to the relationship between the spreading blade, deposited liquid and surface coagulant.

FIG. 10 is a cross-sectional view of a portion of the foraminous sheet material made on the forming surface of FIG. 9.

FIG. 14 is a cross-sectional view showing a laminated material having the sheet material of FIGS. 10–12 as its inner layer, and a stretch fabric for each of its outer layers.

FIG. 19 shows still another modification of the foraminous sheet material capable of production in accordance with a modified forming surface of my invention, which includes a desired graduated variation in the thickness of the material.

FIG. 20 represents a modified, but somewhat less advantageous technique for providing openings through the sheet material.

FIG. 31 illustrates still another alternative apparatus embraced by my inventive concepts.

Figure 3:
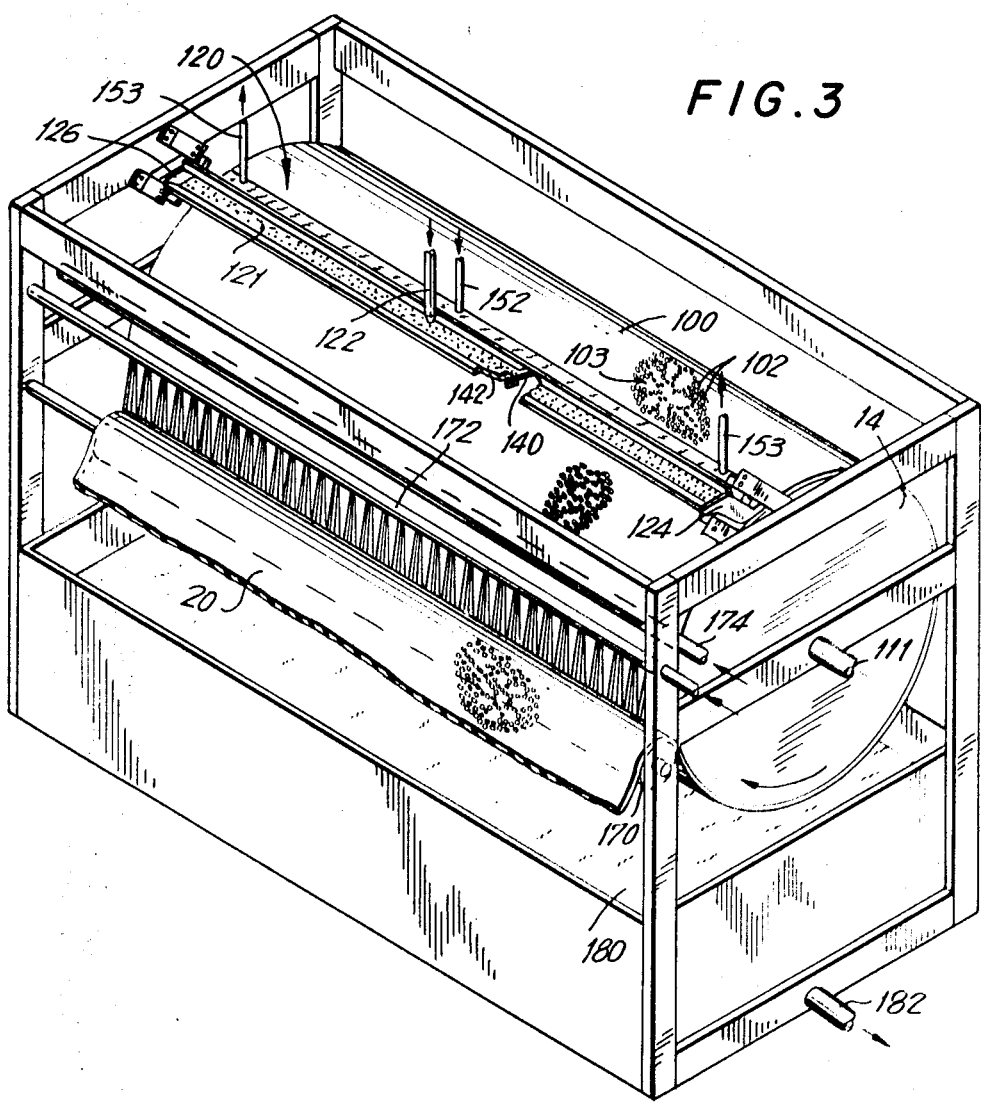
FIG. 3 is a perspective view of a portion of the apparatus shown in FIGS. 1 and 2, particularly directed towards showing the forming of the sheet material on a rotating cylindrical form.

Reference is now made to FIGS. 1–7 which illustrate an embodiment of my invention which has demonstrated particularly advantageous results.

The apparatus or machine 10 may be separated into five principal components, generally shown by the dashed lines, and indicated by the region designations 10–1, 10–2, 10–3, 10–4, and 10–5. The present invention is particularly concerned with the portion of the machine designated 10–1. It is this portion of the machine which receives the liquid latex and deposits same on the surface of a rotating cylinder 14. The liquid latex is then coagulated and removed from the forming surface as a sheet 20. The detailed explanation of this principal portion of the apparatus will subsequently follow.

Consideration will now be directed to the sequential operations performed by apparatus 10 after the sheet 20 leaves the formation section 10–1. The sheet then progresses to washing section 10–2 where a plurality of water jets 22, 24 and 26 wash off any coagulating liquid or other chemicals still remaining on the sheet. Sheet 20 then progresses to a drying section 10–3 which includes a plurality of heated rollers, generally shown as 25, for suitably preparing the sheet before presentation to the laminating section 10–4. Laminating section 10–4 preferably includes means for simultaneously laminating thin stretch fabric outer layers to both sides of the sheet material 20. These stretch fabric layers 31, 33, are provided by rolls, 30, 32 respectively. Sheet material 20 passes through an adhesive applying means 35 which applies an appropriate adhesive (such as a tacky latex) to both sides of the material. The stretch fabric layers are fed along pin and tenter frames 31–1, 33–1 to pressure rollers 36, which surface-bond the outer fabric layers to the inner layer 20, forming a trilaminate 50. Trilaminate 50 then progresses through the blanket belt portion 38 of the laminating section, onto conveyor means 40, to the curing or vulcanizing oven 45.

The drive for the various sections 10–1, 10–2, 10–3, 10–4, are advantageously fed off a common motor 52. It should naturally be understood that the individual sections of the apparatus may be driven by individual drive means. However, the utilization of a common motor 52 assists in providing appropriate synchronization of the various sections. Motor 52 has an output indicated as 54. Output 54 drives gear box 56 of the section 10–1. Gear box 56 has an output gear 58 that is connected via chain drive 60 to gear member 62 mounted at the center of the cylinder 14 to effect rotation thereof.

The opposite end of the motor output 54 is shown connected to successively placed gear boxes 64, 66, 68, 70, 72, 74 and 76. Gear box 64 is interconnected via chain drive 78 to the gear member 80. This causes translation of the conveyor belt 82, serving to move sheet material 20 through the washing section 10–2. The drying section 10–3 is driven by the variable speed drive box 66. The output gear 84 of this drive box is connected via a chain drive 85 to a multiple gear member 87. Multiple gear member 87 includes a first gear which engages endless drive belt 95. The drive belt 95 is successively connected to the axial gears on each of the drive rolls 25 for rotating same in tandem. Another gear member of the multiple gear 87 is connected to a gear 92, which drives the conveyor belt 94, for moving the sheet material 20 into the laminating section 10–4.

The laminating section is in turn driven by the interconnected gear boxes 68, 70, 72, 74 and 76. The output of gear box 68 drives the roll 30, for feeding the fabric 31 which is to be applied to one of the surfaces of the sheet material 20. The output of gear box 76 similarly drives the other roll 32 of fabric 33 which is to be applied to the other surface of the sheet material 20. The output of gear box 72 drives the adhesive application means 35. Adhesive application means 35 includes a first adhesive applicator 35–1 for applying a desired amount of adhesive to one surface of the sheet 20, and a second adhesive applicator 35–2 for applying adhesive to the other surface of the sheet material 20. The sheet material 20 then progresses upward to the laminating section 34, where pressure rollers 36, apply the desired pressure for appropriately surface bonding the outer-fabric layers 31–33 to the inner sheet material 20. The laminate 50 now moves to the blanket belt section 38. This section is driven by the output gear box 70 via the belt member 91.

It should be understood, however, that section 10–4 is only one of numerous type of laminating arrangements which may be practiced in conjunction with the novel manufactured article of my invention. In those instances where the sheet material is required without any outer fabric layers, the laminating section 10–4 may be dispensed with. Also, wherein it is desired to laminate fabric to only one side of the sheet material, appropriate laminating machines well-known in the textile art may be employed. A pair of such machines may also be employed to successively apply first and second outer fabric layers, in place of the above discussed simultaneous arrangement.

The laminated sheet material 50, then progresses via conveyor 40 to the curing or vulcanizing section 10–5, which includes an appropriate heated chamber 45, of the type well-known in the latex treatment art. It should naturally be understood that, when other types of coagulable liquids are used which do not require the application of such heat for curing the section 10–5 of the apparatus may be omitted, (e.g. pre-cured liquid latex).

Reference is now made more specifically to the portion of the apparatus designated 10–1 where the sheet material 20 is formed from the deposited liquid latex. This portion of the apparatus includes a forming means 14, shown as a rotatable cylinder. Cylinder 14 may be constructed of steel, and is preferably chrome plated. The face of the cylinder provides a forming surface 100 having a plurality of spaced projections 108. The spaces between the projections define open faced locations, such as 102 and 103, for the deposited latex layer (see FIG. 6). The projections include upstanding wall sections 107 terminating at top surfaces 110. These top surfaces may, therefore, be considered as collectively defining the outer surface of the forming means 14. It should be noted at this point that some of the open faced locations, such as 103, are of a significantly lesser depth than others such as 102. (The depth of locations 102 and 103 may for example be in the order of 0.030 and 0.020 inch, respectively.) This relates to the particular configuration of the forming surface 100 and will be subsequently discussed in greater detail in conjunction with FIGS. 10–12. It should, however, be recognized that the lesser depth location 103 will naturally have a lesser thickness of liquid latex deposited thereon.

In the particular embodiment shown, the latex liquid is heat sensitive. The forming cylinder 14 is hollow and an appropriate heat source is internally applied for heating the forming surface 100. The heat source may be provided by steam supplied to inlet 111 (FIG. 3) and directed to the circumferential region of the cylinder by conduit member 112. (FIG. 4). The steam may typically be at an appropriate temperature to maintain the outer forming surface 100 of the cylinder at approximately 180°–200° F. This will serve to rapidly progress the coagulation of the liquid latex into a sheet from the time it is deposited on the forming means 14 to the time that it is stripped off.

Figure 9:
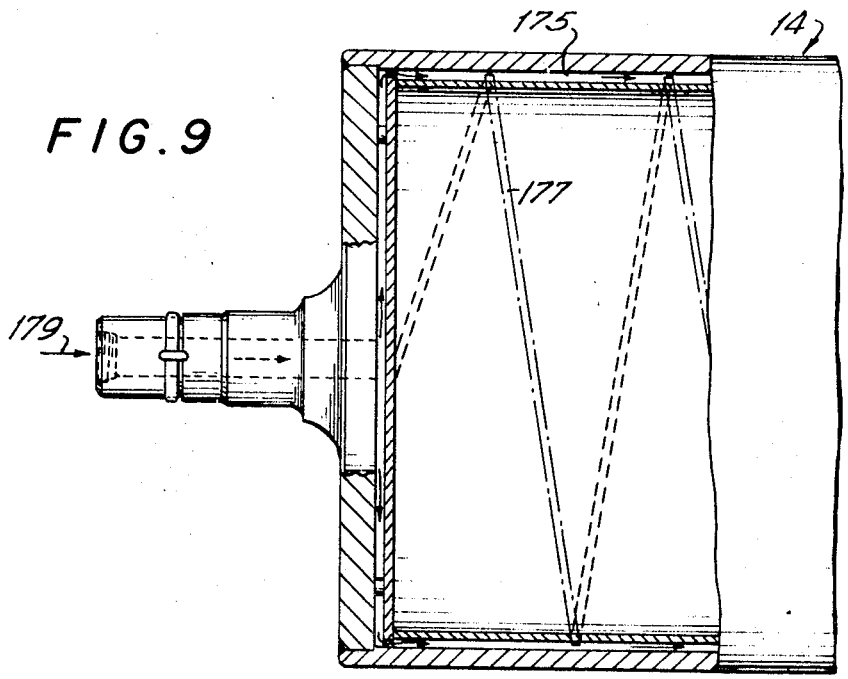
FIG. 9 is a cross-sectional view showing an alternative drum configuration, specifically directed to a modified arrangement for heating the drum surface and accelerating the coagulation of the deposited liquid, as well as the forming of the sheeting.

FIG. 9 shows an alternative arrangement for heating the surface of the cylinder in order to progress the coagulation of the deposited latex liquid into a sheet. The cylinder includes an internal circumferential pocket 175 and baffles 177. The input steam at 179 is direction to the circumferential region of the cylinder 14 and thereby heats the forming surface 100.

The depositing means, generally shown as 120, includes an inlet tube 122 (for example) for continuously supplying liquid latex at a predetermined rate. Depositing means 120 is in the form of a trough having transverse end members 124, 126, and forward and rear support members 128, 130 respectively. A spreading means in the form of a flexible blade 132 is appropriately connected to support 128, as by bolt means 129. The rear end of the depositing trough is defined by another flexible blade member 140. This blade is similarly secured to support member 130 by bolts means 143. The support members 128, 130 are, in turn, secured to angle members 144, 145, for mounting the depositing means 120 in proper position with respect to the moving cylindrical surface 100. The arcuate space between blades 132, 140, adjacent the cylinder, forms a movable feeding mouth for the latex bearing trough.

Figure 8:
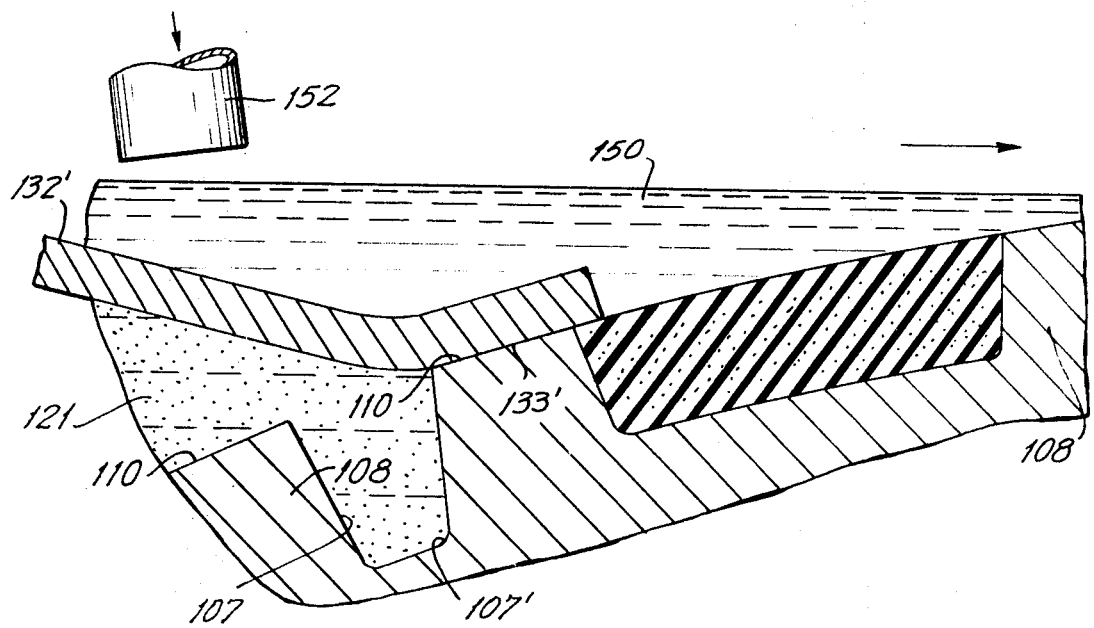
FIG. 8 is a view corresponding to FIG. 6, but shows a modified arrangement between the edge region of the flexible spreading blade and the forming surface.

The edge region 133 of the flexible blade is in immediate contact with the liquid latex as it emerges from under the depositing means 120. Blade member 132 must be of sufficient resiliency to make continuous contact with the successively presented tips 110 of the projections 108—it being recognized that due to manufacturing tolerances and wear the location of these top surfaces, may deviate somewhat for an exact cylinder. The blade member 132 must also have sufficient rigidity to span over the wider locations 103, and withstand the tendency of the liquid flowing thereunder from lifting the blade out of contact with the outer surface of the cylinder. Hence, the selection of the proper blade material is dependent upon such factors as the viscosity of the latex liquid, the configuration of the forming surface, and the rotational speed of the cylinder. In the embodiment shown in FIGS. 1–7, I have obtained particularly favorable results using a spreading blade constructed of 0.006 inch thick blued, spring steel. The contact of the spreading blade 132 along the tops 110 of the projections is shown in FIG. 6 as a line-to-surface contact at blade edge region 133. It should be understood that as wear progresses this edge region may deviate somewhat from an exact line-to-surface contact, and may in practice eventually provide a blade surface of small dimensional extent against the projection top surfaces. Alternatively, it is proposed that under certain conditions of operation the spreading blade member may take the form shown by 132' of FIG. 8, where a blade spreading surface 133' is shown in contact with the top surface 110 of the projection.

The blade members 132, 140 defined the boundaries of the trough's bottom opening. Since this opening is in juxtaposition to the forming surface 100, the forming surface serves as a relatively movable mouth for the latex reservoir 121. As the cylinder rotates in the direction indicated by the arrow, a depth of latex is drawn out of the reservoir 121, completely filling the open faced locations 102, 103 of the forming surface. As the forming surface moves out from under the reservoir's mouth the back edge region 133 wipes the projection tops 110. This wiping insures that the open faced locations 102, 103 are substantially filled with the liquid latex, and also serves to control the depth of liquid latex. The latex thickness is defined by the distance between the cylinder's outer surface (described by the projection tops 110) and the base means 104, 106 (see FIG. 6).

In summary, the blade member 132 serves as a spreading means, which is predeterminedly positioned with respect to the forming surface 100 to control the deposit of liquid latex out of the reservoir, and thereby provide a desired depth of the liquid latex on the forming surface. My use of the term "predetermined depth" is herein intended to define the depth of material between the base means 104, 106 of the forming surface, and the outer liquid layer established by the location of the blade edge region 133. That term is intended to include a variation in such depth at different regions of the forming surface.

It has been found that the deposited latex tends to flow over the projection tops 110 during this spreading operation. Hence, instead of having a clean hole at each of the projection locations, a thin film would be formed over the projection tops. Accordingly, means are provided to treat the surface of the latex liquid deposition as it emerges from under the blade member 132 to inhibit the tendency of the liquid latex to film over the projection tops and thereby provide through-openings at the projection locations. I have found that this may be preferably accomplished by immediately introducing a surface coagulant to the emerging liquid latex layer. Especially advantageous results have been obtained by using an active coagulating gelling liquid, such as an aqueous solution of calcium chloride or calcium nitrate, of appropriate concentration (e.g. approximately 10–15%). Alternatively a weak acid, such as acetic may be used.

In accordance with the embodiment shown in FIGS. 1–7 the surface coagulant is provided by a pool 150 of the coagulating liquid. The pool 150 is maintained by locating the depositing means 120 behind the top-center location 151 (FIG. 5) of the rotating cylinder. The blade member 132 provides a valley along an intermediate region of its outer surface, with the liquid coagulant pool being provided within the volume defined by this valley. As the cylinder rotates, the coagulant of pool 150 is applied to the blade edge region 133 and the just emerging latex layer. It has been demonstrated that this serves to sufficiently inhibit formation of a coagulated film layer over the projection tops 110 to provide clean openings at each of the projection locations.

Figure 15:
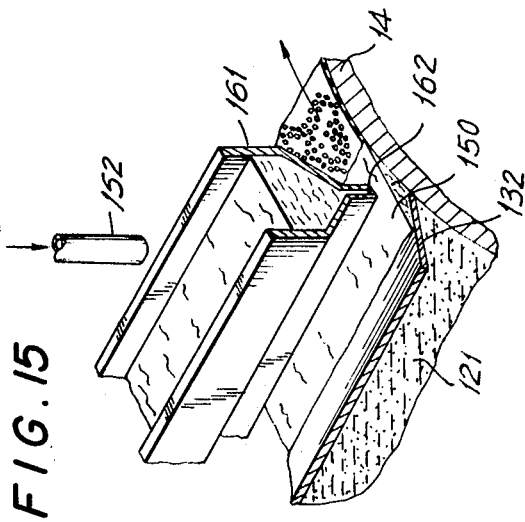
FIG. 15 is a simplified perspective view showing a modified arrangement for applying the surface coagulant.

The liquid coagulant is continuously fed into the pool 150, for example by an input tube 152. Excess flooding of the coagulant along the edges of the cylinder may be prevented by a pair of take-up suction tubes 153. An alternative arrangement for feeding the liquid coagulant into the pool 150 is shown in FIG. 15, where a trough 161 is shown. The trough has a narrow slot opening 162 for maintaining the desired level of liquid in the surface coagulant pool. Suction tubes (not shown) may also be located at the edges of the cylinder.

It has also been found that as the latex emerges from under the blade edge region 133 there is a tendency of some latex coagulum to form along the blade edge region. A build-up of this coagulum will have a deleterious effect on the formation of acceptable foraminous sheet material. Hence, means are provided for continuously cleaning the blade edge region and preventing this build-up. I have determined that this function is preferably served by the continuous application of the liquid coagulant from pool 150 over the blade edge region.

Hence, the provision of the liquid coagulant pool 150 simultaneously and efficiently serves the two important functions of inhibiting the establishment of a coagulated film over the projection tops and cleaning any latex coagulum off the blade edge region.

The predetermined thickness of latex liquid, emerging from the depositing means 120 must then be maintained on the forming surface 100 a sufficient interval of time to permit it to be gelled and stripped off as a self-sustaining sheet 20. In order to accelerate the manufacturing rate, the latex liquid includes heat-sensitizers to accelerate its coagulation. It should, however, be understood that the utilization of a heat-sensitive latex is not an absolute requirement, but is only a practical expedient, with non-heat-sensitive coagulable liquids being usable as long as the forming surface is of a sufficient length, or its speed sufficiently slow, to provide sufficient time for coagulation before stripping of the sheet material. The stripping of the sheet material is facilitated by a rubber idler roller 170 and high pressure water jets 172. The water jets additionally serve to wash off any coagulating liquid that may remain on the cylinder, and thereby prepare it for the next deposit of latex liquid.

The water emerging from jets 172 is collected in a pool 180, having a discharge outlet 182. As the cylinder 14 continues its rotation it is then presented to an air jet 174 which suitably dries the cylinder's surface 100 before the next application of latex. Preferably a cleaning brush 184 is also provided. Brush 184 is on arm 185, which is pivotally mounted at 186. The cleaning brush may be used during the transient start-up time of the machine, until the sheet material 20 begins to peel off the cylinder in its normal easy manner. The cleaning brush 184 may then move out of engagement with the cylinder, as shown by the dotted condition of FIG. 4.

The stripping of the sheet material 20 off the circumference of the cylinder 14 is further facilitated by the sloped sides 107 of the projections. The sloped sidewalls are analogous to the draft provided in a casting operation, to facilitate the removal of the cast product from its mold. A fillet round 107' is also provided where the sidewalls 107 of the projection meet the bottoms 104, 106. Fillets 107', in addition to facilitating the stripping of the sheet 20, also serve to provide an advantageous end-product by the elimination of sharp edges in the sheet material which would tend to cause a weakened region about the holes.

The draft along the side walls 107 of the projections 108 may be achieved in an inexpensive manner by fabricating the forming surface 100 with standard engraving tools. Thus, the cylinder 14 may be considered as having an engraved roll coating 100 formed by fabrication techniques of the type well-known for the manufacture of pressure embossing rolls.

In accordance with another advantageous practical aspect of the apparatus shown in FIGS. 1 through 7, the edge region 133 of the spreading and wiping blade 132 is canted relative to the placement of the projections 108 on the forming surface. This is best seen in FIGS. 1 through 7 where the edge 133 of the blade 132 is shown in simplified form by the dotted line 133–1, and the line joining the centers of adjacent rows of projection is shown as 108–1. With the pattern shown in FIGS. 1 through 7, an angle of about 15° between axes 108–1 and 133–1 has demonstrated particularly favorable results.

The projections 108 of the forming surface shown in FIGS. 1 through 7 are in 60° relationship, as shown by the lines 190, forming equilateral triangles. This provides a preferable commercial product simulating a lace-like product. With such a configuration it has been determined that maximum openness with maximum strength of material is obtained by having a hexagonal hole shape. Hence, the projections 108 are of such a cross-section, with their corners being rounded so as to again prevent the formation of any sharp edges in the hole. The petal portions of this configuration are advantageously formed at the location 103 of the forming surface. Alternatively, the petals may be formed by a suitable spacing of the holes.

Figure 16:
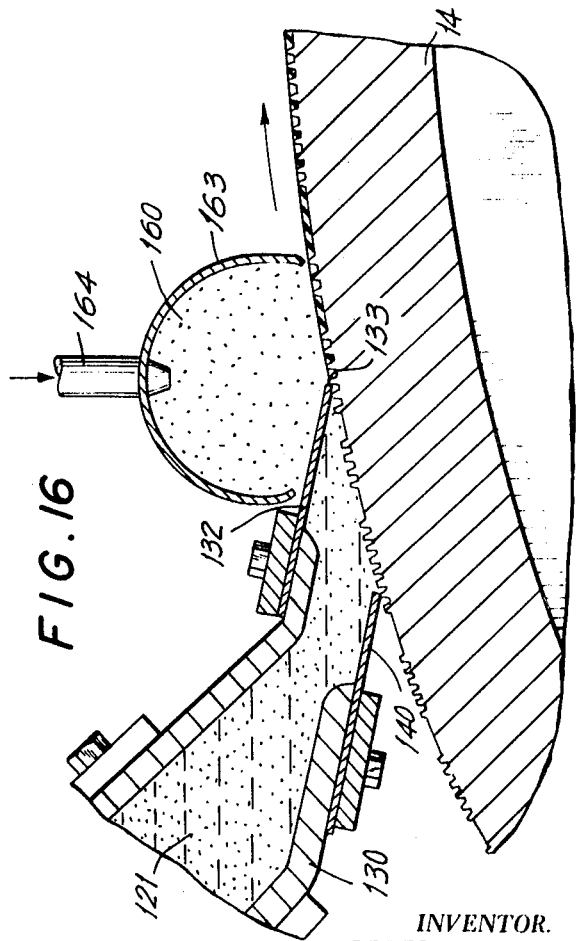
FIG. 16 is still another modification for applying the surface coagulant, in which the surface coagulant is a gaseous vapor, or nebulized spray.

Although I have found that the use of a liquid surface coagulant works particularly well, it is suggested that other active surface coagulants may be used. FIG. 16 shows one possible alternative where a gaseous or nebulized coagulant 160 is provided with a shroud member 163, such that this surface coagulant, fed by inlet means 164, is effectively applied to the edge region 133 of blade 132, and the immediately emerging liquid latex. The gas 160 may for example be carbon dioxide or any other suitable gaseous or nebulized substance for rapidly lowering the pH of the latex surface, so as to effect a rapid surface gelling. As another alternative it is suggested that heat may be applied to this region, as by an infra-red source (not shown).

Figure 11:
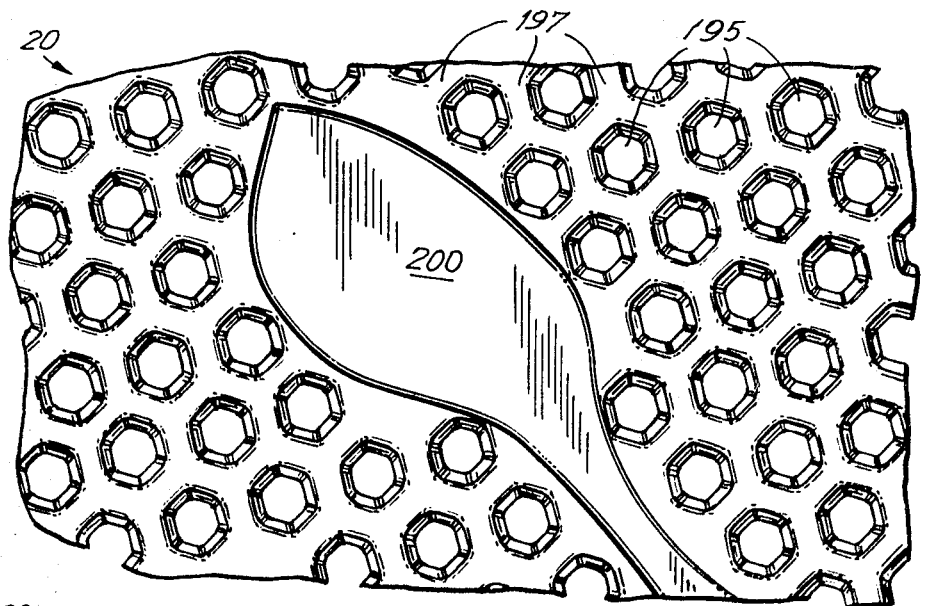
FIG. 11 is a top view of the sheet material shown in FIG. 10, as indicated by the arrows 11—11.
Figure 12:
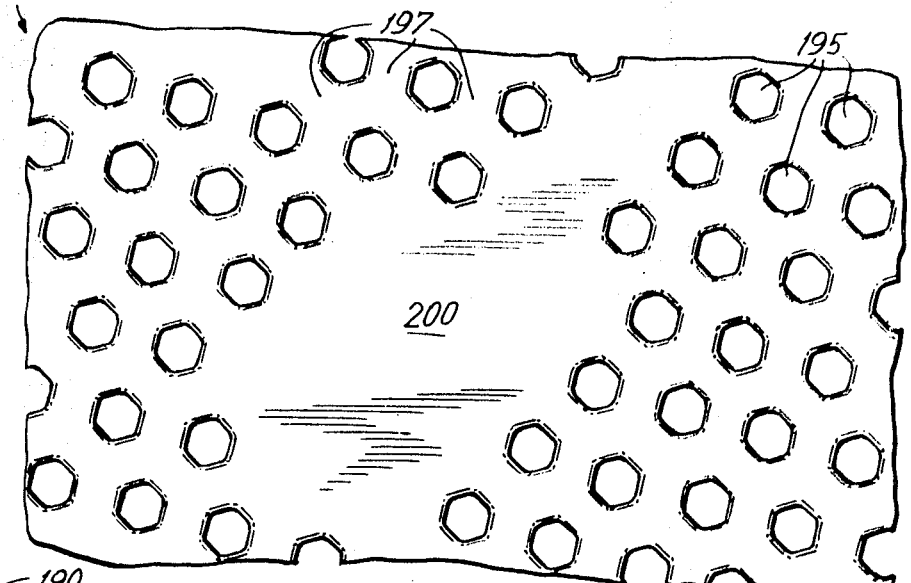
FIG. 12 is a bottom view of the sheet material of FIG. 10, as indicated by the arrows 12—12.
Figure 7:
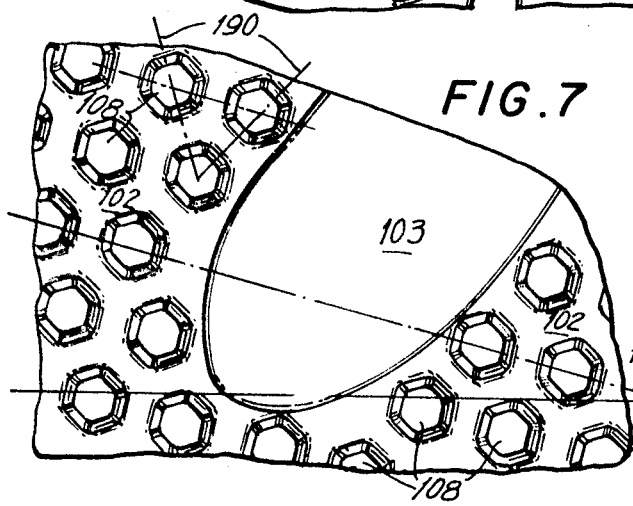
FIG. 7 is an enlargement of a portion of the forming surface, in accordance with a particular configuration for fabricating lace-like sheet material.

Reference is now made to the FIGS. 10–12, which show a portion of the foraminous sheet material formed on the apparatus of FIGS. 1–7. The sheet material 20 includes a hole 195 at each of the locations corresponding to the projection 108. The hole partakes of the projection formation, and hence has a smaller upper cross section, than lower cross section. The transition regions 197 between the holes are preferably of a cross sectional configuration to provide maximum strength, porosity of the material, and wearing comfort when laminated and made into a garment.

In accordance with one particularly advantageous aspect of a form of my invention, the foraminous sheet material has a lesser thickness at the relatively closed regions 200 of the sheet material which include the petal portions of the lace-like configuration.

Should both the relatively closed and relatively open regions be of the same thickness (as in my prior art spray produced material) there will be more rubber per unit area in the relatively closed regions than in the relatively open mesh-like regions. As a result, the closed regions will not stretch as much as the open regions. Hence, the relatively open regions may be subjected to undue stresses, thereby tending to reduce the useful life of the products formed therefrom. This is particularly true when the sheet material is to be used in conjunction with body constricting garments, such as girdles, where certain portions of the garment may be subjected to substantial repeated stresses. Accordingly, by reducing the cross-sectional thickness of the petals, I tend to provide a more uniform stretch throughout the sub-areas of the sheet material. For example, the transition regions 197 between the openings 195 may have a thickness in the order of 0.025 inch, and the thickness of the solid petal regions 200 may be in the order of 0.015 inch.

As another alternative, the forming surface may be suitably modified to provide the material for a girdle having a reinforced thicker panel section as compared to the new portions intended for other regions of the garment. Such a girdle may be made without it being necessary to sew such panel sections to the main body section, as is the common practice since, to make certain areas of the foraminous material thicker than other areas, requires only that forming surface be of a greater depth at such areas. Consequently it is possible to provide a localized thicker control panel, by making the panel sections deeper than the other parts of the foraminous material.

Figure 13:
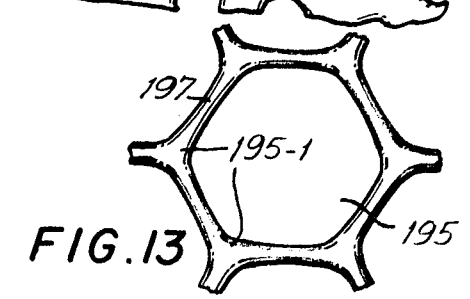
FIG. 13 is an enlarged view showing the manner in which the elastomeric sheet material of FIGS. 10–12 typically stretches about one of its openings.

FIG. 13 shows a portion of the foraminous inner layer surrounding one of the holes 195, when subjected to a considerable stretching force. It should be noted that when the hole 195 enlarges, and the widths of the transition regions 197 diminish, the provision of rounded corners 195–1 serve to eliminate weak points, that would tend to cause rupture of the sheet.

Reference is now made to FIG. 14 which shows the laminated material 50, consisting of the intermediate foraminous sheet material 20, and thin stretch fabric outer layers 31, 32 bonded thereto. The surface 50–1 of the laminated material will tend to have a more pronounced presentation of the lace-like configuration than surface 50–2. Thus, when the laminated material is used for the manufacture of a garment surface 50–1 may be placed on the outside of the garment.

Figure 17:
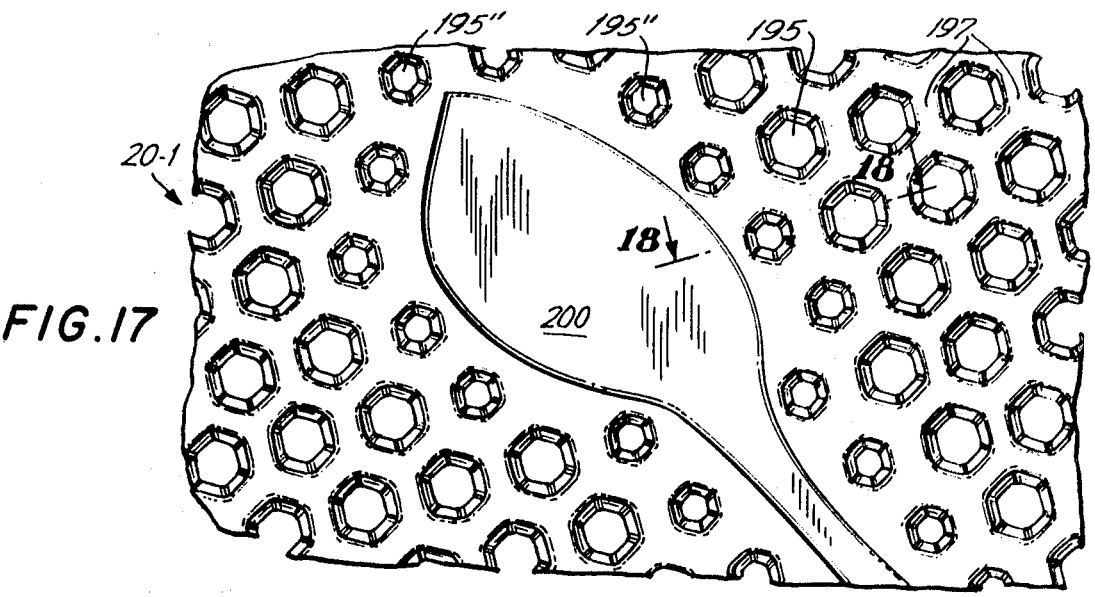
FIG. 17 represents a modified product readily capable of production in accordance with my invention, in which lesser cross-sectional openings border certain regions of the lace-like configuration.
Figure 18:
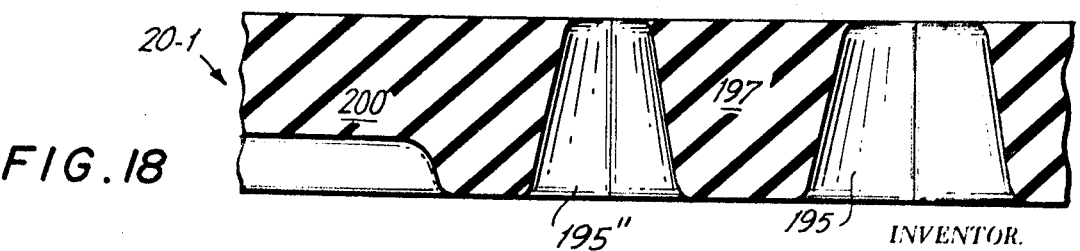
FIG. 18 is a cross-sectional view of FIG. 17 along the line 18—18 thereof.

Reference is now made to FIGS. 17 and 18 which show still another modification of the foraminous sheet material for equalizing the stresses over its various sub-areas. The material 20–1 corresponds to previously discussed sheet 20 except that the holes 195″ bordering the relatively closed regions 200 of the petals may be of a reduced cross-section. Since substantial stresses would occur in those regions of the sheet material wherein the relatively open mesh-like regions meet the more stretch resistant closed regions, the provision of such reduced cross-section holes 195″ further serves to reduce this stretch gradient and prevent stress damage.

Referring to FIG. 19, still another modification is shown for providing more uniform stretch over the sub-areas of the sheet material 20–2. Rather than having only two thicknesses of material, as shown in FIG. 10, a gradual change is provided between the relatively closed region 200 at the left and relatively open region at the right. Thus, one or more intermediate transition regions may be provided in which the material is of an intermediate thickness, between the minimum thickness of the relatively closed region and the maximum thickness of the open mesh-like region. This intermediate transitional region includes holes 195″ which may be of the same cross-sectional area as holes 195, or may be of reduced cross-sectional area in accordance with the technique of FIGS. 17 and 18.

FIG. 20 relates to a modified apparatus for forming foraminous sheet material 20–3, acceptable for some purposes. This material includes a thin film 210 which overlies at least some of the hole locations 195. This film may be the result of a transient insufficiency in the operation of the surface coagulant. Thin film 210 may be ruptured by the high pressure application of a liquid 212, such as water supplied by jet 214. Where it is anticipated that some slight amount of filming may occur, jet 214 may be provided by one or more of the washing jets 22, 24 or 26 (FIG. 2).

Figure 21:
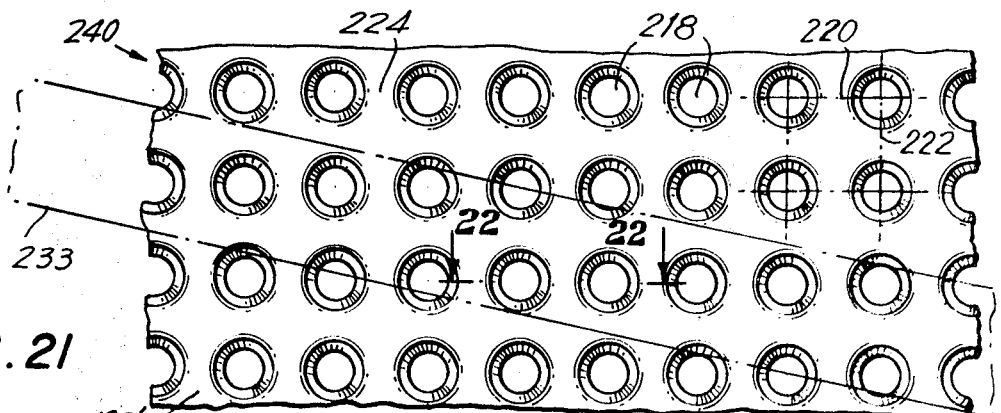
FIG. 21 is a top view of still another configuration of foraminous sheet material in accordance with the present invention, in which the holes are of uniform size and are disposed in a uniform pattern.
Figure 22:
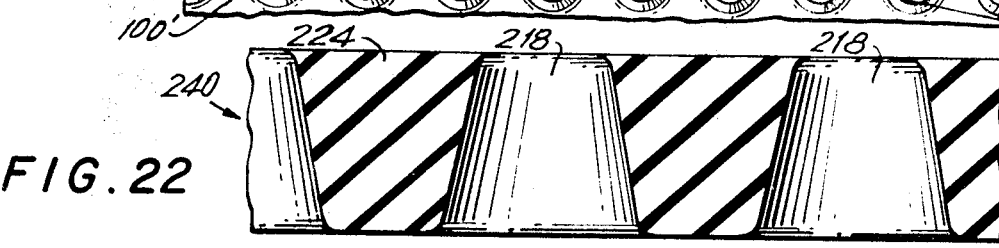
FIG. 22 is a cross-sectional view of FIG. 21, as shown by the arrows 22—22 thereof.

Reference is there made to FIG. 21 which shows another type of forming surface 100' which may be provided about the circumference of the forming cylinder 14. This forming surface includes a plurality of regularly spaced projections 218. These projections are circular in cross-section and disposed in a 90° pattern as shown by the lines 220, 222. Forming surfaces 100' includes transition regions 224 of uniform depths. The sheet material 240 of FIG. 22, which is produced on such a form demonstrates improved strength, and may advantageously be used where a lace-like configuration is not commercially dictated.

Figure 23:
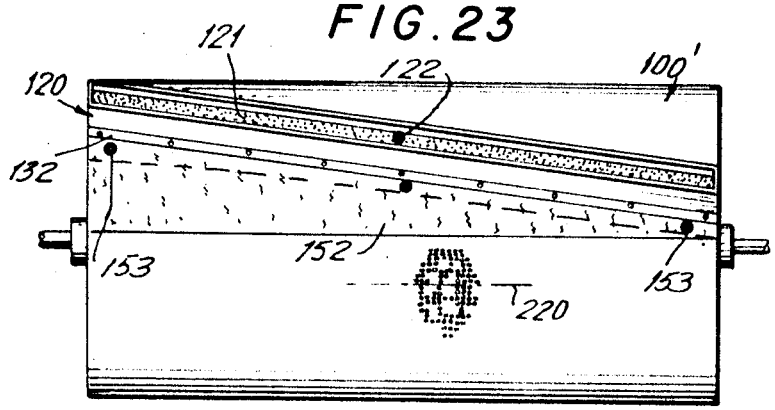
FIG. 23 shows in simplified form, a cylinder which may be used to fabricate the sheet material of FIGS. 21 and 22.

Line 223 indicates in phantom the relationship of the spreading means blade, and the projections of the forming surface to prevent abrupt jumping of the wiping blade from row to row. This canted relationship is preferably provided by an angular off-set between the rows of projection 218, and the axis of the cylinder, similar to that shown in FIG. 1. Alternatively, where the rows of the projections, as shown by the line 220, are parallel to the axis of the cylinder the depositing means 120 may be canted to give the angular off-set, as shown in FIG. 23.

Reference is now made to FIGS. 24 through 29 which compare micro-photographs of products which may typically be made in accordance with the present invention, and the prior art spray deposition process.

Figure 24:
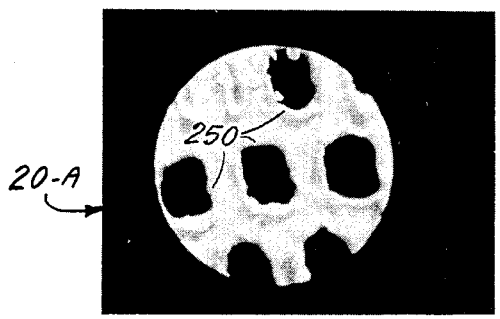
FIG. 24 is a micro-photograph of one of the surfaces typically present in foraminous sheet material formed in accordance with the prior art spray apparatus.
Figure 25:
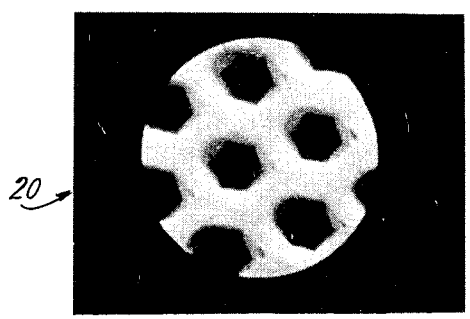
FIG. 25 is a similar micro-photograph of the corresponding surface produced in foraminous sheet material of the present invention.

FIG. 24 shows the prior art material 20–A which is formed by the spraying of latex droplets on a lace belt. The surface shown in FIG. 24 is the surface formed against the belt, and thereafter stripped off the lace belt. It should be noted that roughened edges or surface fissures 250 exist about each of the holes, and other regions of the material. This should now be contrasted to FIG. 25 which showed the much smoother surface of the material 20 adjacent the form of my invention.

Since the deterioration of the latex material initiates as a surface effect the minimization of surface provides a longer lasting product.

Figure 30:
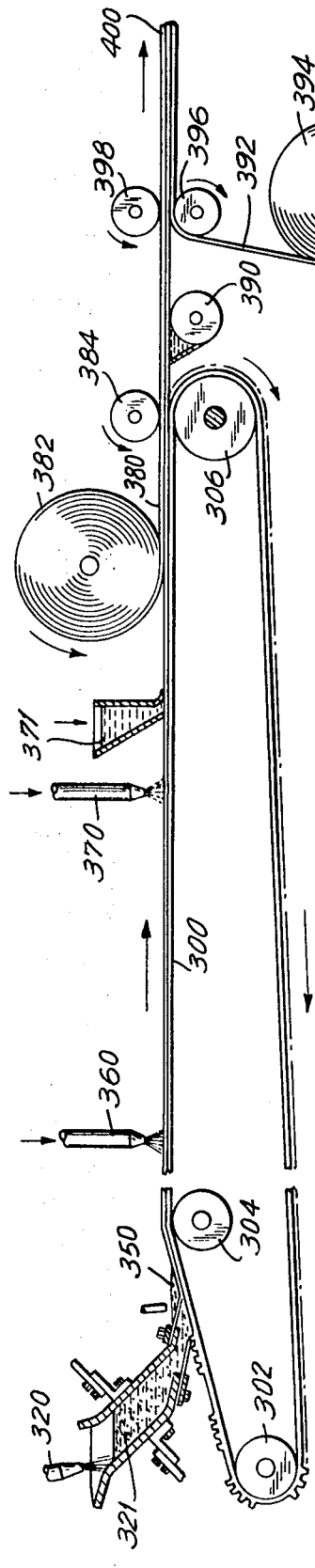
FIG. 30 shows, in simplified form, a modification of my invention in which the forming surface is an endless conveyor belt.
Figure 26:
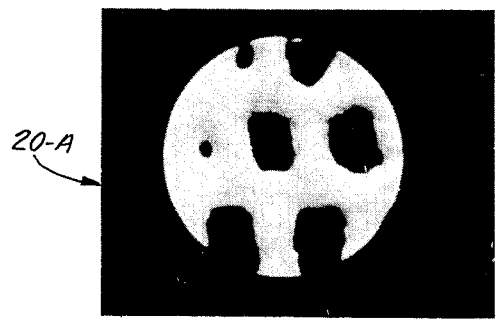
FIGS. 26 and 27 show the opposite surfaces of the materials in FIGS. 24 and 25, respectively.
Figure 27:
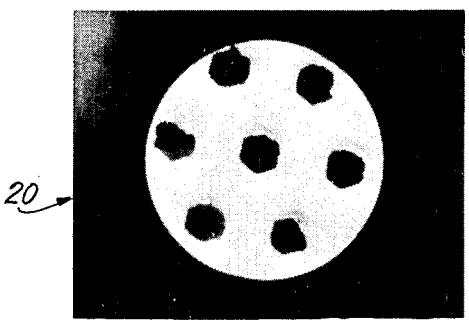
Figure 28:
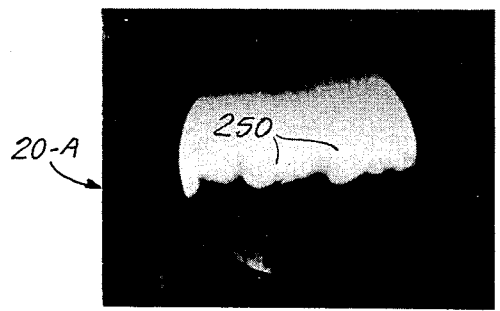
FIGS. 28 and 29 are cross-sectional views of the materials shown in FIGS. 24 and 27.
Figure 29:
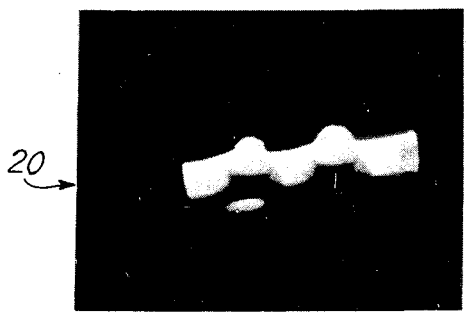

FIGS. 26 and 27 show the opposite surfaces of the FIGS. 26 and 27 materials, respectively. Again, the present product of FIG. 29 shows a very smooth surface, free of surface fissures. FIGS. 30 and 31 show cross sectional views of these materials.

FIG. 30 represents another modification of my invention where the forming surface is provided on an endless conveyor belt 300 and either (or both) the belt or depositing means is moveable. Endless conveyor belt 300 may be constructed of a suitable plastic material having a forming surface. The forming surface may have the lace configuration of FIGS. 1–7, the uniform hole spacing of FIG. 21, or any other desired configuration. Conveyor belt 300 is driven by rollers 302, 304, 306 there being an upward relationship between the rollers 302, 304. The depositing means 320 substantially corresponds to depositing means 120 shown in the embodiment of FIGS. 1–7, and includes a liquid latex reservoir 321 in a trough-like enclosure. The endless conveyor belt serves as a moving feeding mouth for the trough. The liquid coagulant pool 350 corresponds to pool 150 of the previous embodiment. The conveyor belt may be of sufficient length intermediate the broken away regions to obtain substantial coagulation without heat sensitive latex. Alternatively a heat sensitive latex may be used and an appropriate heating means may be applied to the endless conveyor belt.

Conveyor belt then passes through washing station 360 where one or more jets of water are applied thereto, and then subsequently to a drying station 370 where air is directed against the sheet material. The sheet material may then be stripped off the forming conveyor. Alternatively a fabric laminate may first be applied to one surface. This is shown by the application of an adhesive latex at 371 and the bonding thereto of a thin fabric layer 380 from roll 382. The layer passes between roller 306 and 384 to apply appropriate laminating pressure to effect a good surface bond. Where a trilaminate material is required, a layer of adhesive may be then applied to the opposite side of the sheet at adhesive station 390. The additional layer of fabric 392 from roll 394 is then laminated onto the material as it passes intermediate pressure rollers 396, 398. Hence the sheet material 400 emerging therefrom will be a trilaminate having an inner layer formed in accordance with my invention, and two outer fabric layers.

FIG. 31 shows, in simplified form, another modification of an apparatus in accordance with my invention, for forming thin foraminous sheet material. Apparatus 300 includes a cylinder which essentially corresponds to cylinder 14 of the embodiment shown in FIGS. 1–7. This cylinder has plurality of spaced projections in accordance with the desired configuration of the resultant foraminous sheet material. The depositing means 304 includes a trough-like reservoir which contains liquid latex 306. The feeding mouth 308 is positioned adjacent the cylinder's forming surface, and includes the blades 310, 312 to define an arcuate opening. The cylinder may also have at appropriate heat source means 112 to accelerate the gelation of the deposited liquid latex to sheet material.

Prior to the deposition of the liquid latex a coagulant means 320 coats the entire forming surface of the cylinder with a liquid coagulant. A surface treatment means 330 is immediately applied along the top surfaces of the forming projections, to prevent the subsequent formation of a coagulated film over such top surfaces. Such surface treatment means may be provided by a liquid solution of a neutralizer such as sodium hydroxide, or a silicone to prevent the filming over the projection top surfaces. The neutralizer may be applied by a rubber roller 332 withdrawing such liquid from a trough 334 containing a supply of the liquid. The depositing means 304 must include an appropriate cleaning arrangement to prevent the formation of a latex coagulum on the edge region of blade 312. This may be provided by appropriate heating of the blade, or the application of water or a mild soap solution 340 which will prevent exposure of the blade edge region to air. The sheet material then coagulates on the cylinder's surface, and is removed at the location which includes stripping roller 345 and water jets 347. The cylinder surface is then dried by an air source 344, and is then presented to coagulant supply source 320 to initiate another cycle of operation.

As previously noted, I have obtained particularly favorable results using a heat sensitive latex as my gelling or coagulable liquid. This heat sensitive latex is appropriately compounded in accordance with the desired characteristics of the end product and the machine parameters.

The following compound has provided desired results when used with the apparatus of FIGS. 1–7.

| Example 1: | Parts by weight |
| --- | --- |
| Natural rubber latex | 100.0 |
| Stabilizers | .75 |
| Sulfur | 1.0 |
| Accelerators | 1.5 |
| Activator | 1.0 |
| Antioxidant | 1.0 |
| Wax emulsion (ultra-violet protection) | 1.0 |
| Titanium oxide (whitener) | 10.0 |
| Ammonium nitrate (heat sensitizer) | 1.0 |

This compound has a viscosity in the range of 1500–1800 centipoises. Other compounds having a viscosity of up to 2400 centipoises have also demonstrated favorable performance. It should be understood that the variation in viscosities would be dependent on such other parameters as the trough opening and the relative motion between the trough and forming surface.

The following compounds, noted in my aforementioned patent application Ser. No. 704,783 have also provided acceptable results:

| Example 2: | Parts by weight |
|---|---|
| Natural rubber latex | 100.0 |
| Sulfur | 1.0 |
| Titanium dioxide | 10.0 |
| Zinc oxide | 1.0 |
| Stabilizer | .75 |
| Accelerator | 1.25 |
| Antioxidant | 1.0 |
| Heat sensitizer | 1.0 |

| Example 3: | Parts by weight |
|---|---|
| Natural rubber latex | 100.0 |
| Alkali | .8 |
| Potassium oleate | .5 |
| Sulfur | 1.0 |
| Zinc oxide | 1.0 |
| Stabilizer | .75 |
| Accelerator | 1.25 |
| Antioxidant | 1.0 |
| Heat sensitizer | 1.0 |

| Example 4: | Parts by weight |
|---|---|
| Natural rubber latex | 100.0 |
| Alkali | .8 |
| Sulfur | 1.0 |
| Zinc oxide | 1.0 |
| Stabilizer | .75 |
| Accelerator | 1.25 |
| Antioxidant | 1.0 |
| Ammonium oleate | .5 |

It should be noted, in Example 4, that the heat sensitizing agent may be omitted from the compound if ammonium oleate is added to that compound because, it has been found, such ammonium oleate makes the compound sufficiently heat sensitive to be used in the method of this invention.

The previous examples are compounded by mixing the various materials, the ingredients being added to the latex as indicated above, the liquids as solutions and the solids as dispersions.

Among the heat sensitizing agents which have been found particularly effective are ammonium nitrate, sodium fluosilicate, ammoniacal zinc acetate, diphenylguanidine gantrez (as supplied by the GAF Corporation of New York, N.Y.), triacetin, nitromethane, and nitropropane.

It is therefore seen that the present invention relates to an improved apparatus for forming sheet material from a coagulable liquid, such as a latex.

What is claimed is:

1. An apparatus for the continuous formation of foraminous elastomeric sheet material from a deposited liquid which in dry form possesses elastomeric properties comprising:
   a forming means having a forming surface to receive said liquid with means for retaining such liquid on the forming surface;
   a depositing means for depositing the liquid on said forming surface;
   said depositing means including a reservoir for the liquid;
   drive means for providing relative movement between said reservoir and forming surface;
   said reservoir having an exit constituting a feeding mouth which comprises a moving portion of the forming surface adjacent thereto, such that successive portions of the forming surface are sequentially fed a liquid deposition by said reservoir;
   said depositing means having spreading means contiguous to said feeding mouth;
   said spreading means positioned with respect to said forming surface to control the deposition of said liquid on the forming surface;
   said forming surface including means for establishing a plurality of opening locations in the deposition;
   means for treating the liquid deposition to provide through openings at said opening locations, means for substantially gelling the deposition to form foraminous sheet material; and
   stripping means for removing said foraminous sheet material from said forming surface.

2. An apparatus as set forth in claim 1, wherein:
   said means for treating the liquid deposition to provide through-openings includes a surface gelling means positioned for immediate application to the surface of the liquid layer as it emerges from under said spreading means.

3. An apparatus as set forth in claim 1, wherein:
   said forming surface having predetermined base means, with said means for defining the opening locations comprising individual spaced projections extending therefrom and the spaces between said projections defining open faced locations for receiving the deposited liquid; and
   said projections having individual top surfaces.

4. An apparatus as set forth in claim 1, wherein:
   said spreading means includes a flexible blade member extending transverse to the drive means movement; and
   said blade member is in contact with the outward surface of the deposited liquid layer as it emerges from the reservoir feeding bottom.

5. An apparatus as set forth in claim 4, wherein:
   said means for treating liquid deposition to provide through-openings includes a surface gelling means positioned for immediate application to the outward surface of the liquid layer as it emerges from under said blade member; and
   said surface gelling means is in contact with the edge region of the blade member and emerging liquid layer.

6. An apparatus as set forth in claim 5, wherein:
   said blade member is positioned relative to the forming surface to provide a valley therebetween in communication with the blade edge region; and
   said surface gelling means is provided in a liquid pool located within said valley.

7. An apparatus as set forth in claim 1, wherein:
   said forming means is a cylinder, said forming surface is provided about the face of said cylinder; and
   said drive means rotates said cylinder while said depositing means is stationary.

8. An apparatus as set forth in claim 1, wherein:
   said forming means is an endless conveyer belt.

9. An apparatus as set forth in claim 8, wherein:
   said drive means moves said belt while said depositing means is stationary.

10. An apparatus as set forth in claim 3, wherein:
    said forming means is a cylinder;
    said forming surface is provided about the face of said cylinder: and
    said drive means rotates said cylinder while said depositing means is stationary.

11. An apparatus as set forth in claim 4, wherein:
    said forming means is a cylinder;
    said forming surface is provided about the face of said cylinder; and
    said drive means rotates said cylinder while said depositing means is stationary.

12. An apparatus as set forth in claim 1, wherein;
    said deposited liquid is a latex.

13. An apparatus as set forth in claim 4, wherein:
    said deposited liquid is a latex, and further including;
    blade cleaning means acting directly on said blade member for preventing latex coagulum along the blade spreading region.

14. An apparatus as set forth in claim 5, wherein:
said deposited liquid is a latex, and further including;
blade cleaning means acting directly on said blade member for preventing latex coagulum along the blade spreading region;
said blade cleaning means provided by said surface gelling means in contact therewith.

15. An apparatus as set forth in claim 14, wherein:
said blade member is positioned relative to the forming surface to provide a valley therebetween in communication with the blade edge region; and
said surface gelling means is provided in a liquid pool located within said valley.

16. An apparatus as set forth in claim 3, wherein:
said deposited liquid is a latex;
said reservoir is a latex bearing trough; and
said projection top surfaces and base means define the relatively movable feeding mouth for said reservoir with such relative movement depositing a desired depth of latex.

17. An apparatus as set forth in claim 16, wherein:
said spreading means includes a blade member extending transverse to the drive means movement; and
said blade member is in contact with the outward surface of the liquid latex as it emerges from the reservoir feeding bottom.

18. An apparatus as set forth in claim 17, wherein:
said means for treating the liquid deposition to provide through-openings includes surface gelling means positioned for immediate application to the outward surface of the liquid latex as it emerges from under said blade member; and
said surface gelling means is in contact with the edge region of the blade member and emerging liquid latex.

19. An apparatus as set forth in claim 18, wherein:
said blade member is positioned relative to the forming surface to provide a valley therebetween in communication with the blade edge region; and
said surface gelling means is provided in a liquid pool located within said valley.

20. An apparatus as set forth in claim 16, wherein:
said forming means is a cylinder, said forming surface is provided about the face of said cylinder;
said drive means rotates said cylinder while said depositing means is stationary; and
said relatively movable feeding mouth is a curvilinear portion of the moving cylindrical surface.

21. An apparatus as set forth in claim 1, further including:
heating means applied to said forming surface to accelerate the coagulation and formation of the sheet material from the deposited liquid.

22. The apparatus of claim 21, wherein:
said deposited liquid is a heat-sensitive latex.

23. The apparatus as set forth in claim 3, wherein:
said spreading means contacts the relatively movable projection top surfaces, such that the depth of the liquid deposition is defined by the distance between said outer forming surface contacted by the spreading means and said base means with said projections extending completely through said desired depth of liquid; and
said means for treating the liquid deposition to provide through-openings including means for inhibiting the deposition from forming a film over said projection top surfaces, such that the gelled sheet material is formed with a hole location at each of the projection locations.

24. The apparatus as set forth in claim 23, wherein:
said means for inhibiting the forming of a film over said projection top surfaces, includes a surface gelling means positioned for immediate application to the outward surface of the deposited liquid layer as it emerges from under said spreading means.

25. The apparatus as set forth in claim 24, wherein:
said surface gelling means completely prevents the liquid deposition from filming over said projections, such that said hole locations include well defined openings extending completely through the sheet material at the projection locations.

26. The apparatus as set forth in claim 24, wherein:
said spreading means includes a flexible blade member extending transverse to the drive means movement; and
said surface gelling means including an active surface gelling agent in contact with the edge region of the blade member and emerging liquid layer.

27. The apparatus as set forth in claim 26, wherein:
said blade member is positioned relative to the forming surface to provide a valley therebetween in communication with the blade edge region; and
said active surface gelling agent is provided in a liquid pool located within said valley.

28. The apparatus as set forth in claim 27, wherein:
said liquid deposition is a latex, and further including;
blade cleaning means acting directly on said blade member for preventing latex coagulum along the blade spreading region; and
said blade cleaning means provided by said active gelling agent in contact therewith.

29. The apparatus as set forth in claim 28, wherein:
said forming means is a cylinder;
said forming surface is provided about the face of said cylinder; and
said drive means rotates said cylinder while said depositing means is stationary.

30. The apparatus as set forth in claim 28, wherein:
said latex liquid is heat sensitive, and said apparatus further including;
heating means applied to said forming surface to accelerate the coagulation and sheet forming from the deposited liquid.

31. The apparatus as set forth in claim 23, wherein:
the forming surface open faced locations comprising a first group are of a predetermined lesser depth than a second group of said open faced locations; and
the sheet material formed on the forming surface is of predetermined lesser thickness at the locations of the individual open faced locations forming said first group.

32. An apparatus as set forth in claim 23, wherein:
said projections are positioned on said forming surface to define a desired configuration, with said configuration serving as a pattern for the hole locations in the sheet material formed thereon.

33. The apparatus as set forth in claim 23, wherein:
said projections are positioned on said forming surface to define a desired configuration with said configuration serving as a pattern for the hole locations in the sheet material formed thereon;
said pattern having relatively closed areas, having a greater surface of deposited material per unit area than in other relatively open areas; and
at least some of the projections which border portions of said relatively closed areas being of reduced cross-section, to thereby provide holes of lesser cross-section at such bordering portions.

34. The apparatus as set forth in claim 31, wherein:
said projections are positioned on said forming surface to define a desired configuration, with said configuration serving as a pattern for the hole locations in the sheet material formed thereon;
said pattern having relatively closed areas, having a greater surface of deposited material per unit area than in other relatively open areas; and
the open faced locations at said relatively closed areas being of lesser depth to provide a lesser depth of deposited material at such locations.

35. An apparatus for the continuous formation of foraminous sheet material, comprising:
- a forming means with a forming surface having a plurality of spaced projections that define between them a plurality of open faced locations for receiving a deposited liquid layer;
- said projections having individual top surfaces;
- means to deposit a coagulable liquid onto said forming surface in a manner substantially filling said open faced locations;
- spreading and surface treatment means for simultaneously establishing the outer surface of the deposition and rapidly treating such outer surface of the deposition to prevent the formation of a film over said individual projection top surfaces;
- drive means for causing relative movement between said spreading and surface treatment means, and the forming surface;
- means for substantially gelling the entire depth of the deposition, thereby forming a self-sustaining foraminous sheet having hole locations at each of the projection locations; and
- stripping means for removing said foraminous sheet from said forming means.

36. The apparatus as set forth in claim 35, wherein:
said means for preventing the deposition from forming a film over said individual projecting top surfaces includes a surface coagulant means positioned for immediate application to the outward surface of the deposition as it emerges from under said spreading means.

37. The apparatus as set forth in claim 36, wherein:
said spreading means includes a blade member extending transverse to the drive means movement; and
said surface coagulant means including an active surface coagulant in contact with the edge region of the blade member and emerging liquid layer.

38. The apparatus as set forth in claim 37, wherein:
said coagulable liquid is a latex;
said blade member is positioned relative to the forming surface to provide a valley in communication with the blade edge region; and
said active surface coagulant is provided in a liquid pool located within said valley;
blade cleaning means acting directly on said blade member for preventing latex coagulum along the blade spreading region;
said blade cleaning means provided by said active surface coagulant in contact therewith.

39. The apparatus as set forth in claim 37, wherein:
said forming means is a cylinder;
said forming surface is provided about the face of said cylinder; and
said drive means rotates said cylinder while said deposit means and blade member remain stationary.

40. The apparatus of claim 35, wherein:
said forming surface provides a pattern including relatively closed areas, having a greater surface of deposited material per unit area in other relatively open areas;
at least some of the liquid receiving open-faced locations in said relatively closed areas being of lesser depth than the liquid receiving open-faced locations in said relatively open areas.

41. The apparatus of claim 35, wherein:
said coagulable liquid is a heat sensitive latex; and
heating means is applied to said forming surface to accelerate the gelling of the coagulable liquid.

42. An apparatus for the continuous formation of foraminous sheet material, comprising:
- a rotatable cylinder having an outer cylindrical forming surface;
- said forming surface including a predetermined base means, with individual spaced projections extending therefrom, and the spaces between said projections defining open faced locations for receiving the deposited liquid;
- the inward extent of said open faced locations defined by the base means of said forming surface;
- said projections having individual top surfaces;
- a latex bearing trough positioned above said cylinder for the deposit of latex on the cylinder surface immediately below such trough;
- said trough including a feeding bottom opening of predetermined width in juxtaposition to said cylindrical forming surface, with said cylindrical surface providing a moving bottom boundary surface for accepting latex from said trough;
- said trough including spaced first and second members, in contact with accurately spaced first and second regions, respectively, of said cylindrical surface;
- said first member being a spreading member, extending in the direction of cylinder movement, and wiping the tops of said projections upon emergence from under said trough bottom;
- latex treatment means for preventing the latex from forming a film over the tops of said projections;
- cleaning means for preventing the build-up of latex coagulum along the wiping region of said spreading member;
- means for gelling the latex deposited on said cylindrical forming surface to form foraminous sheet material; and
- stripping means for removing such sheet material from said cylindrical surface.

43. An apparatus as set forth in claim 42, wherein:
both of said latex treatment and cleaning means are provided by an active surface coagulant immediately applied to the liquid latex as it emerges from under said spreading means.

44. An apparatus as set forth in claim 43, wherein:
said spreading member is a resilient blade;
said blade member is positioned relative to said cylindrical forming surface to provide a valley in communication with the blade wiping regions; and
said active surface coagulant is provided in a liquid pool located within said valley.

45. An apparatus as set forth in claim 44, wherein:
said projections are arranged in rows, said rows extending in a direction canted relative to the wiping region of said spreading blade.

46. An apparatus as set forth in claim 44, in which said trough is positioned behind the top-center location of said cylinder.

References Cited

UNITED STATES PATENTS

| | | | |
|---|---|---|---|
| 3,008,182 | 11/1961 | Moore | 264—216 |
| 3,049,761 | 8/1962 | Yakubik | 264—216 |
| 1,921,953 | 8/1933 | Stephens. | |
| 2,796,846 | 6/1957 | Frist. | |
| 2,841,827 | 7/1958 | Crownover | 18—15(F)X |
| 2,932,855 | 4/1960 | Bartlett et al. | 18—15(F)X |
| 2,957,200 | 10/1960 | Pufahl et al. | 18—9 |
| 3,042,968 | 7/1962 | Kraszeski | 18—15 |

ROBERT L. SPICER, Jr., Primary Examiner

U.S. Cl. X.R.

18—4B, 5A, 15S; 118—412; 264—216